(12) United States Patent
Chen

(10) Patent No.: US 7,444,013 B2
(45) Date of Patent: Oct. 28, 2008

(54) METHOD AND APPARATUS FOR RECOVERING DEPTH USING MULTI-PLANE STEREO AND SPATIAL PROPAGATION

(75) Inventor: George Q. Chen, Irvine, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 1019 days.

(21) Appl. No.: 09/927,558

(22) Filed: Aug. 10, 2001

(65) Prior Publication Data

US 2003/0072483 A1   Apr. 17, 2003

(51) Int. Cl.
*G06K 9/00*   (2006.01)
*G06T 17/00*   (2006.01)
*G01B 11/24*   (2006.01)
*G01B 11/30*   (2006.01)

(52) U.S. Cl. ................ 382/154; 345/420; 345/424; 356/611

(58) Field of Classification Search ............... 345/420, 345/424; 382/154; 356/611
See application file for complete search history.

(56) References Cited

U.S. PATENT DOCUMENTS 5,852,672 A * 12/1998 Lu ............................... 382/154
5,917,937 A *  6/1999 Szeliski et al. ............. 382/154
6,046,763 A *  4/2000 Roy ............................. 348/47

OTHER PUBLICATIONS

Chen and Medioni, "A Volumetric Stereo Matching Method: Applicatin to Image-Based Modeling", Proceedings of the Conference on Computer Vision and Pattern Recognition, pp. 29-34, 1999.*
Okutomi and Kanade, "A Multiple-Baseline Stereo", IEEE Transactions of Pattern Analysis and Machine Intelligence, vol. 15, No. 4, Apr. 1993.*
Lewis, "Fast Normalized Cross-Correlation", Vision Interface 1995.*
Zhang et al., "A Robust Technique for Matching Two Uncalibrated Images Through the Recovery of the Unknown Epipolar Geometry", INRIA Rapport de Recherche, n° 2273, May 1994.*

(Continued)

*Primary Examiner*—Matthew C. Bella
*Assistant Examiner*—Wesley Tucker
(74) *Attorney, Agent, or Firm*—Stephen Bongini; Lisa K. Jorgenson

(57) ABSTRACT

An image processing system recovers 3-D depth information for pixels of a base image representing a view of a scene. The system detects a plurality of pixels in a base image that represents a first view of a scene. The system the determines 3-D depth of the plurality of pixels in the base image by matching correspondence to a plurality of pixels in a plurality of images representing a plurality of views of the scene. The system then traces pixels in a virtual piecewise continuous depth surface by spatial propagation starting from the detected pixels in the base image by using the matching and corresponding plurality of pixels in the plurality of images to create the virtual piecewise continuous depth surface viewed from the base image, each successfully traced pixel being associated with a depth in the scene viewed from the base image.

29 Claims, 12 Drawing Sheets

OTHER PUBLICATIONS

Szeliski, "Stereo Algorithms and Representations for Image-Based Rendering", 10th British Machine Vision Conference, 1999.*

Ohta and Kanade, "Stereo by Intra- and Inter- Scanline Search Using Dynamic Programming", IEEE Transactions of Pattern Analysis and Machine Intelligence, vol. PAMI-7, No. 2, Mar. 1985.*

Roy and Cox, "A Maximum-Flow Formulation of the N-Camera Stereo Correspondence Problem", IEEE Proceedings of the International Conference on Computer Vision, Jan. 1998.*

Roy, "Stereo Without Epipolar Lines: A Maximum-Flow Formulation" Internation Journal of Computer Vision 34(2/3) © 1999 Kluwer Academic Publishers.*

Zhao, "Global Optimal Surface from Stereo", Proceedings of the 15th International Conference on Pattern Recognition, vol. 1, Sep. 2000.*

Chen and Medioni, "Efficient Iterative Solution to the M-View Projective Reconstruction Problem", IEEE Computer Society Conference on Computer Vision and Pattern Recognition, vol. 2, Jul. 1999.*

Chen and Medioni, "A Semi-Automatic System to Infer Complex 3-D Shapes from Photographs", IEEE International Conference on Multimedia Computing and Systems, vol. 2, Jun. 1999.*

Chen and Medioni, "Building Human Face Models from Two Images", Proceedings of the IEEE Workshop on Multimedia Signal Processing, Dec. 1998.*

Chen, "Multi-View Image-Based Rendering and Modelin", Ph.D. Thesis, University of Southern California, May 2000.*

Chen, "Robust Point Feature Matching in Projective Space", Proceedings of the 2001 IEEE Computer Society Conference on Computer Vision and Pattern Recognition, vol. 1, Dec. 2001.*

Tang et al., "Dense Stereo Matching Based on Propagation with a Voronoi Diagram", Indian Conference on Computer Vision, Graphics, and Image Processing, Dec. 2002.*

Sun, "Fast Stereo Matching Uding Rectangular Subregioning and 3D Maximum-Surface Techniques", Internation Journal of Computer Vision, vol. 47, No. 1/2/3, May 2002.*

Roy, S. et al., "A Maximum-Flow Formulation of the N-Camera Stereo Correspondence Problem", IEEE International Conference on Computer Vision, 1998, pp. 492-499, XP002346132.

Scharstein, D. et al., "Stereo Matching With Non-Linear Diffusion", Proceedings of the 1996 IEEE Computer Society Conference on Computer Vision and Pattern Recognition, pp. 343-350, XP000640252.

Robert, L. et al., "Dense Depth Map Reconstruction: A Minimization and Regularization Approach Which Preserves Discontinuities", Lecture Notes in Computer Science; vol. 1064, vol. 1, 1996, pp. 439-451, XP008040195.

Zhang, Z et al., "A Robust Technique For Matching Two Uncalibrated Images Through The Recovery of the Unknown Epipolar Geometry", Artificial Intelligence, Elsevier Science Publisher B.V., Amsterdam, vol. 78, No. 1/2, 1995, pp. 87-119, XP001148319.

European Search Report dated Sep. 23, 2005 for European Application No. 02255370.

G.Q. Chen, "Robust Point Feature Matching In Projective Space", Appeared in Proceedings of Computer Vision and Pattern Recognition, 2001, pp. 717-772.

I.J. Cox, "A Maximum Likelihood of N-Camera Stereo Algorithm", IEEE International Conference on Pattern Recognition, 1994, pp. 437-443.

U.R. Dhond et al., "Structure from Stereo—A Review", IEEE Transaction on Systems, Man, and Cybernetics, vol. 19, No. 6, 1989, pp. 1489-1510.

O. Faugeras et al., "Variational Principles, Surface Evolution, PDE's, Level Set Methods and the Stereo Problem", IEEE T. Image Processing, 1999.

A. Fitzgibbon et al., "Automatic 3D Model Acquisition and Generation of New Images from Video Sequences", 3D Structure from Multiple Images of Large-Scale Environments, LNCS 1506, 1998.

S.B. Kang et al., "3-D Scene Data Recovery Using Omnidirectional Multibaseline Stereo", Cambridge Research Laboratory, Technical Report Series, Oct. 1995.

D. Marr et al., "A Computational Theory of Human Stereo Vision", Proceedings of the Royal Society of London, Series B, Biological Sciences, vol. 204, Issue 1156, May. 1979, pp. 301-328.

M. Pollefeys et al., "Self-Calibration and Metric Reconstrudtion in Spite of Varying and Unknown Intrinsic Camera Parameters", International Journal of Computer Vision, 1998.

K. Prazdny, "Detection of Binocular Disparities", 52:93-99 Biological Cybernetics, 1985.

S. Seitz et al., "Photorealistic Scene Reconstruction by Voxel Coloring", Proceedings of Computer Vision and Pattern Recognition Conference, 1997, pp. 1067-1073.

Szeliski, "Video Mosaics for Virtual Environments", IEEE Computer Graphics and Applications, vol. 16, No. 2, 1996, pp. 22-30.

C.K. Tang et al., "Integrated Surface, Curve and Junction Inference from Sparse 3-D Data Sets", PAMI, 20(11), 1998.

G.Q. Wei et al., "Intensity-and Gradient-Based Stereo Matching Using Hierarchical Gaussian Basis Functions", IEEE Transactions on Pattern Analysis and Machine Intelligence, vol. 20, No. 11, Nov. 1998, pp. 1143-1160.

* cited by examiner

METHOD AND APPARATUS FOR RECOVERING DEPTH USING MULTI-PLANE STEREO AND SPATIAL PROPAGATION

CROSS-REFERENCE TO RELATED APPLICATION

This application generally relates to the teachings of U.S. patent application Ser. No. 09/825,266, entitled "Methods And Apparatus For Matching Multiple Images" filed on Apr. 3, 2001, which is assigned to the same assignee as the present patent application and the teachings of which are herein incorporated by reference.

BACKGROUND OF THE INVENTION

1. Field of the Invention

This invention generally relates to the field of image processing systems and methods, and more particularly relates to methods of recovering depth information associated with elements in a base image corresponding to multiple reference image views.

2. Description of Related Art

Image processing systems have attempted to process multiple images (views of a scene) to identify common image features across the different images (different views of a scene), such as to create three-dimensional (3-D) digital content by analyzing the multiple views of the scene. A main problem has been how to determine depth information for image feature elements, such as pixels, of a base image (view of a scene). When a scene is viewed from multiple cameras—one of them chosen as the base view, others as reference ones—the depth information of the scene for image features, such as pixels, in the base view's image plane can be recovered, based on the correspondence relationship between pixels in the base view and in the reference views.

The terminology "binocular stereo" refers to the case where two cameras are used, arranged in parallel to one another, as shown in FIG. 1. The distance between the two cameras is often called a baseline. The terminology "multi-baseline stereo" means the usage of multiple horizontally or vertically arranged cameras, also parallel to each other, as shown in FIG. 2.

Recent development in Image-Based Rendering and Modeling has raised the interest on multi-baseline stereo in the vision community. As a result of using multiple cameras arranged in multiple baselines two advantages are gained over binocular stereo methods, i.e., a decrease of matching ambiguity, and an increase of reconstruction precision.

The basic problem of stereo, regardless how many cameras are used or how they are positioned, is to find the depth value of the 3 dimensional (3-D) scene point seen at each pixel of a base image, using other images as references. To accomplish this, for each pixel in the base image, its corresponding pixels (projections of the same scene point) in the reference images need to be identified. This correspondence problem can be very difficult to solve and impractical to implement, especially for more than a very small number of cameras, e.g., more than about 2 or 3 cameras. In the case of binocular or multi-baseline stereo, the task of establishing correspondence may be simplified in the sense that the corresponding pixels locate on the same horizontal or vertical scan line as the pixel in the base image. This makes possible representing the correspondence with a scalar, or disparity.

However, these binocular or multi-baseline stereo methods typically require special camera setup to achieve a common image plane, so that the cameras are necessarily coplanar and parallel. These methods unfortunately are also limited in the amount of coverage area of a particular scene. Further, these methods include restrictions on the camera placement that tend to complicate the overall image capture process, increase the cost of image capture, and generally make these methods impracticable for more complicated set ups, e.g., with more than a small number of cameras. Typically, in these methods, either a mechanical device is used to ensure the cameras are collinear, or a mathematical process called rectification is performed to correct the mechanical misalignment. Lastly, the accuracy and reliability of results using these prior art methods would tend to be undesirable for serious commercial applications.

Therefore a need exists to overcome the problems with the prior art as discussed above, and particularly for a method and apparatus that can more successfully recover depth information for elements in a base image corresponding across multiple reference images.

SUMMARY OF THE INVENTION

According to a preferred embodiment of the present invention, an image processing system comprises a memory; a controller/processor electrically coupled to the memory; an image matching module, electrically coupled to the controller/processor and to the memory, for providing a plurality of seed pixels that represent 3-D depth of the plurality of pixels in the base image view of a scene by matching correspondence to a plurality of pixels in a plurality of images representing a plurality of views of the scene; and a propagation module, electrically coupled to the controller/processor and to the memory, for tracing pixels in a virtual piecewise continuous depth surface by spatial propagation starting from the provided plurality of seed pixels in the base image by using the matching and corresponding plurality of pixels in the plurality of images to create the virtual piecewise continuous depth surface viewed from the base image, each successfully traced pixel being associated with a depth in the scene viewed from the base image.

The image processing system preferably comprises at least one camera interface, electrically coupled to the controller/processor, for sending image information from at least one camera to the controller/processor.

According to a preferred embodiment of the present invention, the controller/processor, the memory, the image matching module, and the propagation module, are implemented in at least one of an integrated circuit, a circuit supporting substrate, and a scanner.

DESCRIPTION OF THE PREFERRED EMBODIMENTS

Figure 1:
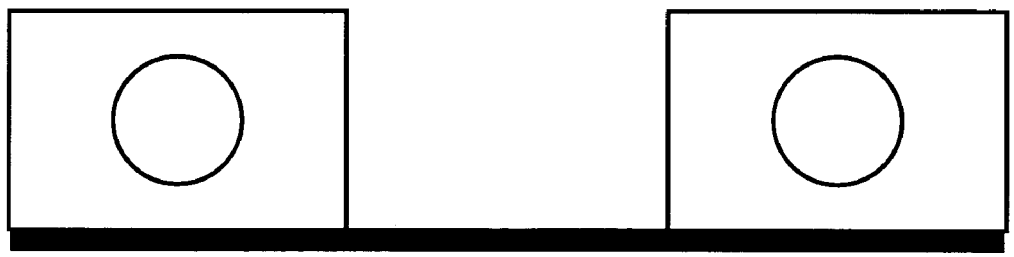
FIG. 1 is a block diagram illustrating a prior art binocular stereo arrangement of cameras.
Figure 2:
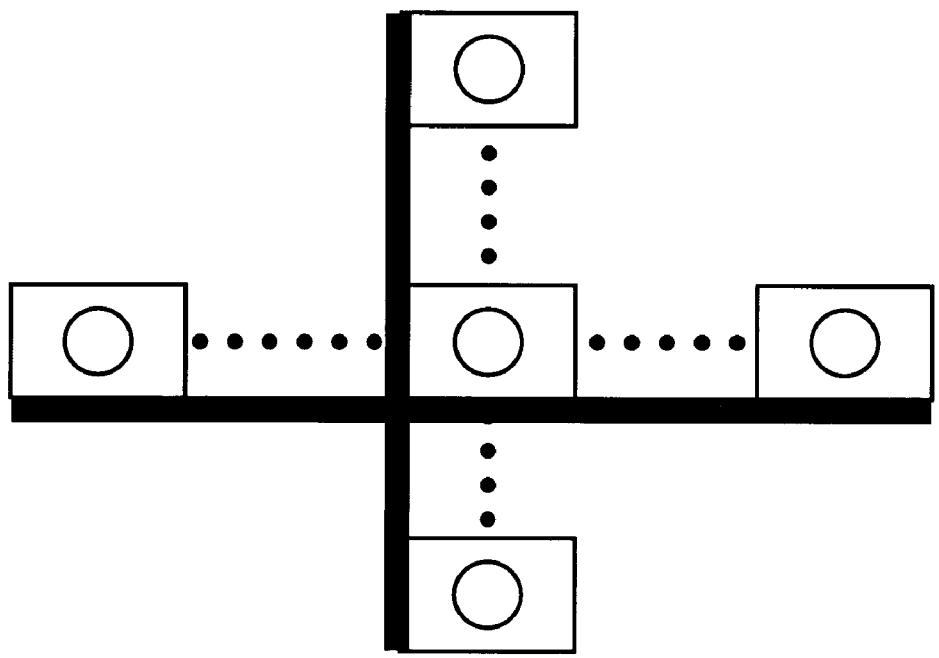
FIG. 2 is a block diagram illustrating a prior art multi-baseline stereo arrangement of cameras.
Figure 3:
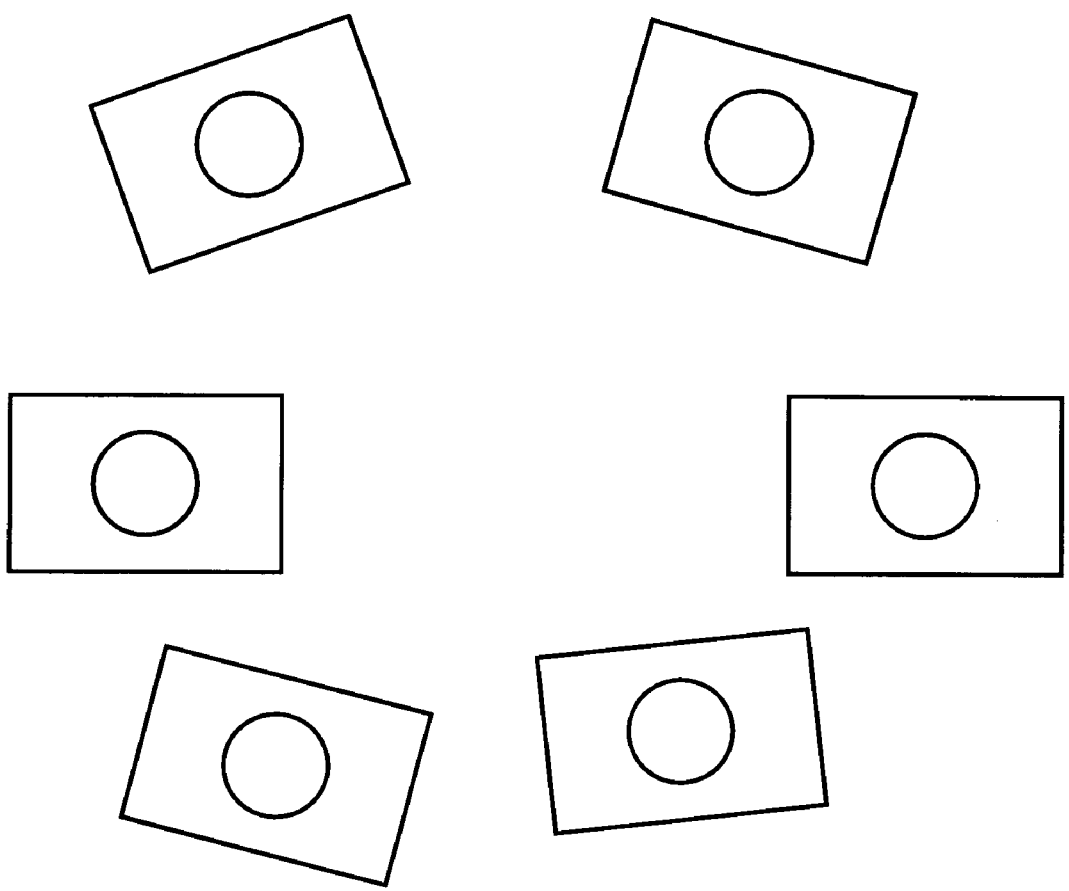
FIG. 3 is a block diagram illustrating a multi-plane stereo arrangement of cameras, according to a preferred embodiment of the present invention.

According to a preferred embodiment of the present invention, a new system and method utilizes a multi-plane stereo (MPS) arrangement of multiple cameras for recovering depth information from a scene. The multiple cameras advantageously are not limited to a coplanar and linear arrangement. See for example the arrangement shown in FIG. 3. According to a preferred embodiment of the present invention, there is no provision as how the cameras should be placed. Each image plane (associated with a particular camera) can be different than the other image planes (associated with the other cameras). Thus, a preferred method is called "multi-plane" stereo.

There are three main advantages with MPS. First, the camera arrangement covers a much larger area of a scene than the other two methods, i.e., the binocular stereo approach and the multi-baseline stereo approach. Second, reducing restrictions on the camera placement means simplification of the overall image information capture process. This makes a commercial application much more practicable and commercially viable.

With the other two prior art methods, either a mechanical device is used to ensure the cameras are collinear, or a mathematical process called rectification is performed to correct the mechanical misalignment. Both of these constraints add tedious extra steps to an overall process of image capture. Additionally, since the multiple camera planes extend in a three-dimensional region, more accurate and reliable results can be obtained.

In addition to binocular stereo and multi-baseline stereo, there has been some existing research on MPS that is mostly based on a regularization theory that suggested solving a Partial Differential Equation (PDE) of the following form:

$$\frac{\partial z}{\partial t} = E_z(u, v, z, z_u, z_v)$$

where E is a function that encodes the similarity of a 3-D point's projection in the base image and its projections in the reference images. In other words, under this theory, z is thought of as a time-varying function governed by the above PDE. The final depth corresponds to the equilibrium state of the evolution. This type of approach will tend to be more costly to implement and will be unable to effectively handle depth discontinuities.

A method, according to a preferred embodiment of the present invention, rather than compute depth at individual pixels, defines a surface, called a depth surface, over an entire base image. This takes advantage of the cohesiveness of opaque object surfaces. This method, in part, takes advantage of a coherence principle. What the principle implies is that most pixels of an image correspond to points of object surfaces where depth vary smoothly. Therefore, locally, depth recovery of neighboring pixels should facilitate each other.

Note that a discretized depth surface can be considered embedded in a volume. Each voxel can represent a possible match and is assigned a scalar value which encodes the quality of the match. The disparity surface comprises voxels with locally maximal values (i.e. best matching quality). The volume is thought of as a 6-connected network of voxels plus a multi-connected source and a sink. Each edge is associated with a scalar, a capacity, that is defined to be the matching cost. Since a likely match has a low matching cost, the corresponding edge capacity will be low and that edge is likely to be saturated by the maximum-flow. Inversely, a high matching cost yields a high capacity edge that is unlikely to be saturated. The set of edges that are saturated by the maximum-flow represent a minimum-cut of the graph. This cut effectively represents the depth surface.

To represent multi-plane stereo 3-D depth information as a surface for an entire base image, a suitable function E is defined over an open subset of the base image which minimize:

$$\int\int E(u, v, z(u, v))dudv \qquad (1)$$

where E is the function that encodes the matching cost, and z(u, v) is the depth surface sought. The corresponding Euler-Lagrange equation is readily obtained:

$$E_z(u, v, z(u, v)) = 0 \qquad (2)$$

where $E_z$ is the partial derivative of E with respect to z. A method that computes z separately for each pixel (u, v) can be deemed as a brute-force solution to (2), one of whose shortcomings is unable to model the surface cohesivity mentioned earlier.

A different method considered the function z(u, v) also a function of time: z(u, v, t), and solved the PDE:

$$\frac{\partial z}{\partial t} = E_z \qquad (3)$$

with some initial condition: $z_0 = z(u, v, 0)$. One can imagine the process that a surface evolves over time, starting from the initial state specified by $z_0$, governed by the PDE, shown by Equation (3) above, and converging to the true solution. One potential problem is that portions of the evolving surface could remain stuck in local minima due to image noise and repetative intensity texture. To circumvent this problem, an image depth recovery algorithm can solve a regularized version of the problem:

$$\int\int E(u, v, z, N)dudv \qquad (4)$$

where $$N = \frac{z_u \times z_v}{|z_u \times z_v|}$$

is the normal of the surface. The surface normal is also used to specify a homography induced by the tangent plane which improves the correlation of matching pixels. The assumption in the variational approach would be that z(u, v) is smooth everywhere, which is often untrue, especially when there are multiple objects in the scene that occlude each other.

According to a preferred embodiment of the present invention, the Multi-Plane Stereo problem can be solved using a variational viewpoint. That is, the depth surface is determined by solving Equation (2) above. However, rather than cast it into a PDE problem where the depth surface evolves in time, a preferred method according to the present invention traces the surface using an approach the inventor calls spatial propagation from known seed points in the object space. The advantage of this spatial propagation approach is that it does not require a depth surface to be smooth everywhere. In the present approach, partial differentiation on z is not explicitly performed which relieves the need on smoothness. Additionally, surface continuity is assumed as long as the propagation proceeds. The latter stops when discontinuity happens.

A preferred method, according to the present invention, is based on the observation that a depth function can be calculated over a piecewise continuous surface over $I_0$—a first image plane viewed from a base view. The preferred method traces the surface calculated by a function resulting in a parameter g, the function starts from some predefined seed points on the surface.

Generating Seed Points By: Single Image Feature Detection,

Two-View Matching Based On Cross-Correlation, Two-View Iterative Refinement, And M-View Robust Matching.

The seed points are, advantageously, obtained as the result of image matching methods such as taught in U.S. patent application Ser. No. 09/825,266, entitled "Methods And Apparatus For Matching Multiple Images", filed on Apr. 3, 2001, which is commonly owned and the entire teachings of which are hereby incorporated by reference.

Since g does not depend on time, a simpler form of equation is solved for g at each pixel position $(u_j, v_j)$:

$$E_g(u, v, g(u, v))=0. \tag{5}$$

For example, let $S=(u_j, v_j, g_j)$ be a seed point, i.e. the depth parameter at pixel $(u_j, v_j)$ is $g_j$. S is then propagated to its four-neighbors at $(u_j-1, v_j), (u_j+1, v_j), (u_j, v_j-1)$ and $(u_j, v_j+1)$. At each of these neighbors, the depth parameter is determined by solving Equation (5) using $g_j$ as the initial value. Propagations from all seeds run concurrently. When two fronts meet, the one with lower cost prevails, the other one stops. Propagation at a pixel also stops when the cost exceeds a certain threshold, or an image border is reached. Note that at a boundary of two surface pieces with different depths, the one with higher intensity texture tends to overshoot. Overshooting of a surface propagation front means wrong correspondences and the matching cost increases sharply which causes it being surpassed by the propagation front of the other surface piece before expanding too far. Thus discontinuity is maintained. The more reference images used, the shorter overshooting, thus the better location of the depth discontinuity edge. Since the propagation actually happens in the object space, it is called spatial propagation.

According to a preferred method utilizing Multi-Plane Stereo, in general an image 3-D reconstruction system starts with m+1 images $I_i(i=0 \ldots m)$ and the associated camera projection matrices $P_i$, and designates one of the images as the base image and the rest as reference images. The system then computes the depth for each pixel in the base image by means of correspondence in the reference images.

Figure 4:
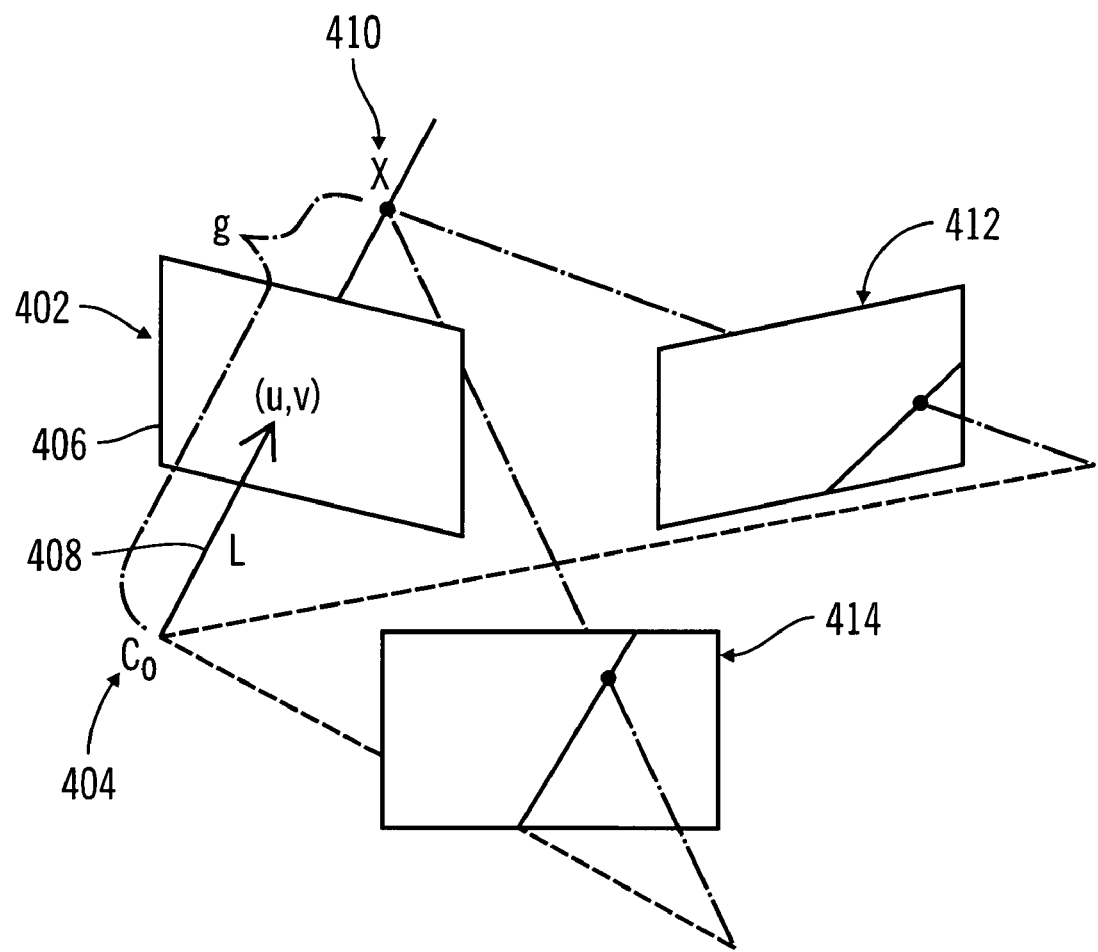
FIG. 4 is a perspective view illustrating an exemplary geometrical relationship between a set of image planes.

According to an exemplary preferred embodiment, in the following discussion with reference to FIG. 4, assume the first image 402 (with index i=0) is the base image 402. $C_0$ is defined as the base camera's center of projection (COP) 404. The image feature designated by (u, v), in this example, is a pixel on the base image plane 406, and L(u, v) 408 is the unit vector from $C_0$ to the point corresponding to (u, v). The position of the 3-D point X 410 that projects to (u, v) can be represented as $C_0+gL(u, v)$. The parameter g is related to the depth of X 410 by $z=g(L \cdot A_0)$ where $A_0$ is the unit vector representing the principal axis of the base camera. The parameter g is referred to herein as the depth parameter. Accordingly, a preferred method repeats the calculation discussed above for other pixels in the base image 402 to compute the function g(u, v) and obtain the parameter g for the other pixels.

A common definition for the matching cost E that appears in Equation (1) comes from the observation that when X 410 is back-projected to the reference images 412, 414, each back-projection $I_i(u', v')$, i=1 . . . m, should reveal a similar intensity to that of $I_0(u, v)$, assuming perfect Lambertian surfaces and constant lighting. A simple way of describing the similarity of $I_i(u', v')$ and $I_0(u, v)$ is the squared difference $D_i=[I_i(u',v')-I_0(u,v)]^2/2$. Use the short hand $(u',v')=P_i(X)$ to denote that (u', v') is the projection of X in the $i^{th}$ view. Then $$D_i=[I_i(P_i(X))-I_0(u, v)]^2/2=[I_i(P_i(C_0+gL(u, v)))-I_0(u, v)]^2/2.$$

Thus, one way of capturing the previous observation is to define E as the sum of $D_i$ over all reference images $I_i$:

$$E = \sum_{i=1}^{m} [I_i(P_i(C_0 + gL(u, v))) - I_0(u, v)]^2 / 2. \tag{6}$$

It follows, then, $$E_g = \sum_{i=1}^{m} [I_i(P_i(X(u, v, g))) - I_0(u, v)]\left(\nabla I_i \cdot \frac{\partial P_i}{\partial g}\right) = 0. \tag{7}$$

At this point, the solution to Equation (7) is postponed. The fact that Equation (7) is non-linear on g thus requires initial values almost immediately suggests a recursive propagation scheme for a discrete solution to g(u, v) over a regular grid. This discrete solution approach is a main focus for an implementation of a system according to a preferred embodiment of the present invention. Additionally, an improved similarity function for the discrete case will be discussed below. In Equation (7) the $E_g$ is calculated using finite difference calculations.

Note a formulation, according to a preferred embodiment of the present invention, the correspondence problem is addressed implicitly with the help of back-projections of a 3-D point in question. This is in contrast with the traditional way the problem has been presented which does not involve 3-D points. Instead, they have been computed in a subsequent step after the correspondence has been established.

Discretization

We are interested in a discrete solution of g(u, v) over a regular grid $(u_j, v_j)$, $u_j=0, \ldots, W-1$, $v_j=0 \ldots, H-1$, where W and H are respectively horizontal and vertical number of pixels of a base image. Given any $u_j$ and $v_j$ within their range, plugging them into Equation (7) results in a non-linear equation on g whose solution is the depth parameter at pixel $(u_j, v_j)$, denoted as $g_j$. Without an initial value for g, one has to resort to a global search on the ray $C_0+gL(u_j, v_j)$. Now, if it happens that one of $(u_j, v_j)$'s four-neighbors has a known depth parameter g', then based on object surface cohesivity, it is likely that $g_j \approx g'$. In other words, one could use g' as an initial value for $g_j$ and refine it later. Applying this analysis recursively leads to the conjecture that as long as there exist some seed pixels whose depth parameters are known, the parameter surface can be traced. When multiple object surfaces with depth discontinuities exist in the scene, theoretically, each piece of surface needs at least one seed.

Let $S=(u_j, v_j, g_j)$ be a seed point, i.e. the depth parameter at pixel $(u_j, v_j)$ is $g_j$. Recall from our discussion above that seed points are preferably obtained as the result of image matching methods such as taught in U.S. patent application Ser. No. 09/825,266, entitled "Methods And Apparatus For Matching Multiple Images", filed on Apr. 3, 2001, which is commonly owned and the entire teachings of which are hereby incorporated by reference.

Then, S is propagated to its four-neighbors at $(u_j-1, v_j)$, $(u_j+1, v_j)$, $(u_j, v_j-1)$ and $(u_j, v_j+1)$. At each of these neighbors, the depth parameter is determined by minimizing Equation (7). Propagations from all seeds operate concurrently. When two fronts meet, the one with lower cost prevails, the other one stops. Propagation at a pixel also stops when the cost exceeds a certain threshold, or an image border is reached. The propagation occurring in the object space is called spatial propagation.

It is observed that, at a boundary of two surface pieces with different depths, the one with higher intensity texture tends to overshoot. Since overshooting means wrong correspondences, its matching cost increases sharply which causes it being surpassed by the propagation front of the other surface piece before expanding too far. Thus discontinuity is maintained. The more reference images used, the shorter overshooting, thus the better location of the depth discontinuity edge.

A Better Similarity Function in Discrete Case

The intuition behind Equation (6) is that intensity values at projections of X in all reference images should be close to $I_0(u, v)$. But the effect of discretization is not considered—we may not actually have a sample at $P_i(C_0+gL(u_j, v_j))$ unless it happens to be a grid point in $I_i$. To cope with errors caused by discretization, it is more appropriate to consider square windows of certain size $\omega \times \omega$ that surround the putative corresponding pixels, and define the matching cost as the normalized cross-correlation (NCC) between the windows:

$$E(g) = \sum_{i=1}^{m} \left\{ 1 - NCC_{\omega}[I_i(\bar{u}(g), \bar{v}(g)), I_0(u_j, v_j)] \right\} \quad (8)$$

where $(\bar{u}, \bar{v})$ is the grid point closest to $P_i(C_0+gL(u_j, v_j))$, and the windows are respectively centered at $(\bar{u}, \bar{v})$ in $I_i$ and $(u_j, v_j)$ in $I_0$. In other words, instead of finding exact fractional pixels that correspond, which normally do not exist in a discrete case, windows with the maximal normalized cross-correlation are corresponded.

Rectification

When used as a similarity measurement for two images, cross-correlation can be improved if the images are rectified—the corresponding epipolar lines become collinear scanlines. Rectification is optionally utilized in a 3-D image reconstruction system according to a preferred embodiment of the present invention.

Rectification undergoes two steps: i) rotating both cameras around their center-of-projections so that their image planes are parallel to each other as well as parallel to the baseline; ii) adjusting the focal length of one or both cameras so that their image planes become coincident. After the rectification, both cameras have same focal length and orientation, and the common image plane is parallel to the baseline. Obviously, there is no unique solution here. Usually, one that minimizes image distortion is sought.

Figure 5:
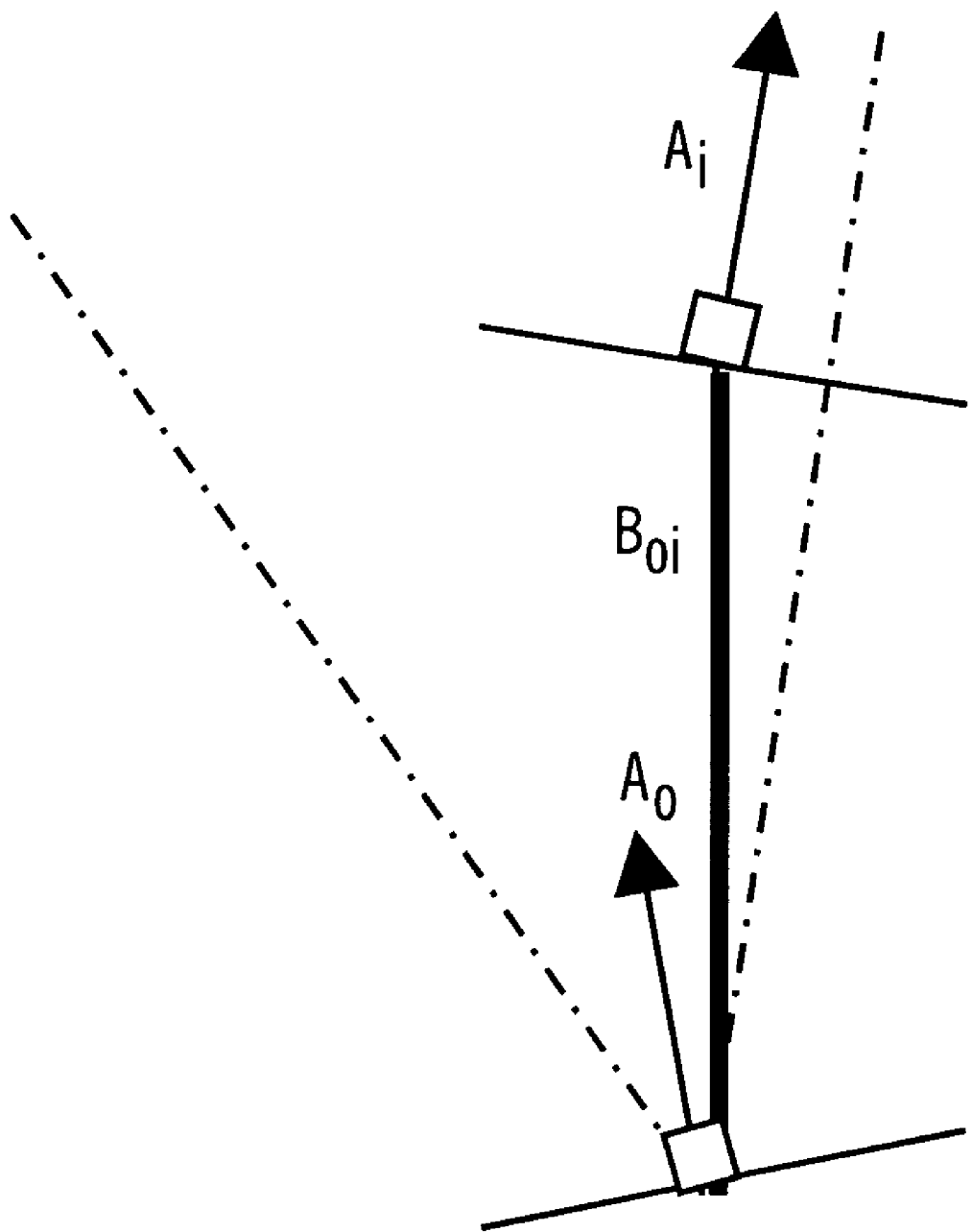
FIG. 5 is a diagram illustrating a potential relationship between images from two cameras.

Let $K_i=\text{diag}(f_i, f_i, 1)$ and $R_i$, $i=0 \ldots m$, be the intrinsic and orientation matrices of the given cameras. Consider a pair of cameras consisting of the base camera and a reference one. A preferred method according to the present invention finds the rectification matrices for this pair. Let $K=\text{diag}(f, f, 1)$ and R be the intrinsic and orientation matrices of the rectified virtual cameras (no translation is involved since the cameras are only rotated). The rectification matrix is $M_i=KRR_i^{-1}K_i^{-1}$. Since the baseline between the base and the $i^{th}$ cameras is known, what remain to be determined are the focal length f and the principal axis A of the virtual cameras. They are given below:

$$f=(f_0+f_i)/2$$

$$A=\text{normalize }\{[B_{0i} \times (A_0+A_i)] \times B_{0i}\} \quad (9)$$

where $B_{0i}$ is the vector representing the baseline. In Equation (9), A is undefined if $B_{0i} \times (A_0+A_i)=0$. In a typical MPS setup, it is expected that all cameras have similar principal axial directions, i.e. $A_0 \approx A_i$. Therefore the above singular condition implies $B_{0i} \approx A_0 \approx A_i$. This corresponds to a situation, as illustrated in FIG. 5, where one camera (thus the epipole) is in the view of the other one. In this situation, however, the depth estimation close to the epipole is highly unreliable. In practice, such kind of degenerate configuration should be avoided. When it happens (within some threshold), rectification should not be performed.

Some Remarks About a Preferred Implementation

1) By explicitly involving the camera projection matrices in the similarity measurement, maximal camera placement flexibility is achieved.

2) Compared to the often-used SSD (Sum of Squared Difference) function, NCC normalizes image intensities.

3) When g varies, $C_0+gL(u_j, v_j)$ spans a ray emitting from $C_0$ and passing the grid point $(u_j, v_j)$. The projection of the ray in the $i^{th}$ reference image—$P_i(C_0+gL(u_j, v_j))$—is an epipolar line in that image. Therefore, the epipolar constraint is implicitly enforced in Equation (8) between the base image and each reference one. This is a very strong condition, especially when the cameras are generally placed.

4) In Equation (8), when m=1, MPS reduces to binocular stereo. When all the cameras are horizontally aligned, i.e. either $\bar{u}=u_j$ or $\bar{v}=v_j$ for $(\bar{u}, \bar{v})$ in all the reference images, MPS reduces to multi-baseline stereo. In this sense, the proposed formulation, according to the present invention, is the most general one because others can be treated as special cases.

Discussion of Some Experimental Results

Figure 6:
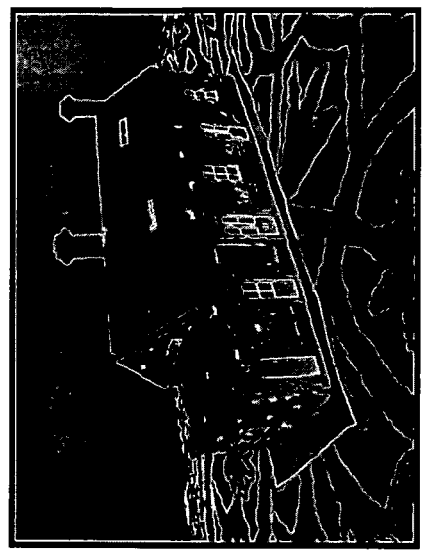
FIG. 6 shows three corresponding images of a scene.
Figure 6:
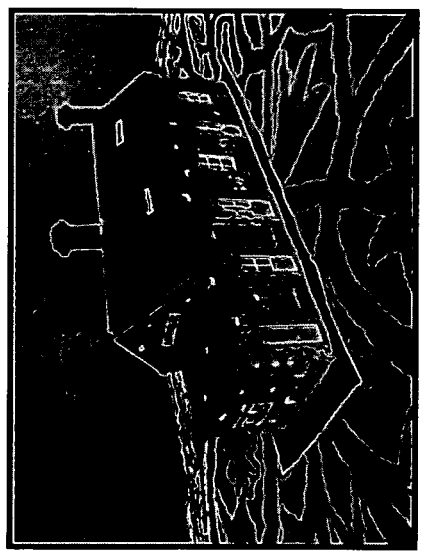
Figure 6:
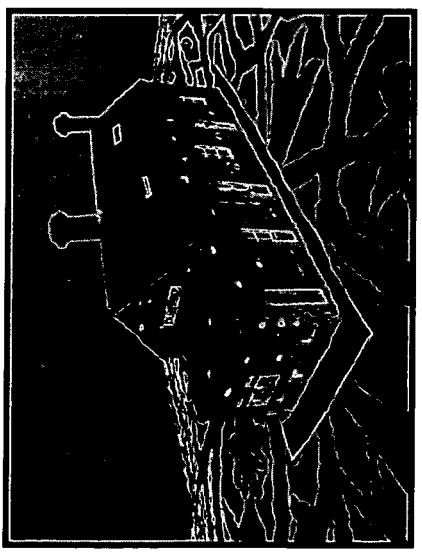
Figure 7:
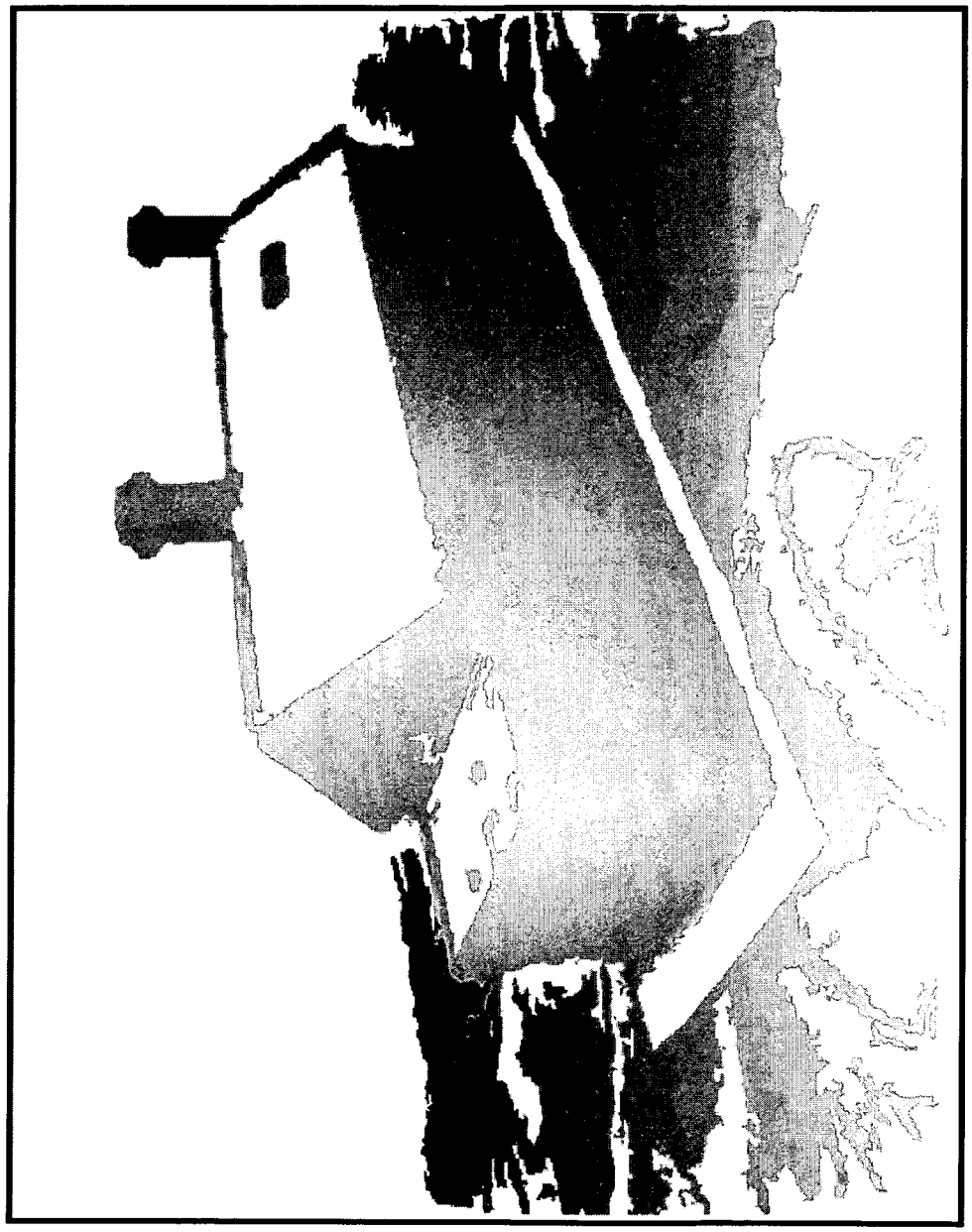
FIG. 7 shows a depth map of the center image of FIG. 6.

In this section, some experimental results are presented. The first example consists of five images, three of them shown in FIG. 6. Among them, the center one is the designated base image. A depth map of the center image of FIG. 6 is shown in FIG. 7 where darker pixels correspond to shorter depth, and where white pixels, on the other hand, represent areas where depth cannot be estimated. Two such areas are observed. First are the background and the roof of the house where intensity texture is insufficient. Second is the frontal part of the carpet where, due to foreshortening, NCC is low (therefore cost is high).

Figure 8:
FIG. 8 shows two views of a reconstructed house model.
Figure 8:
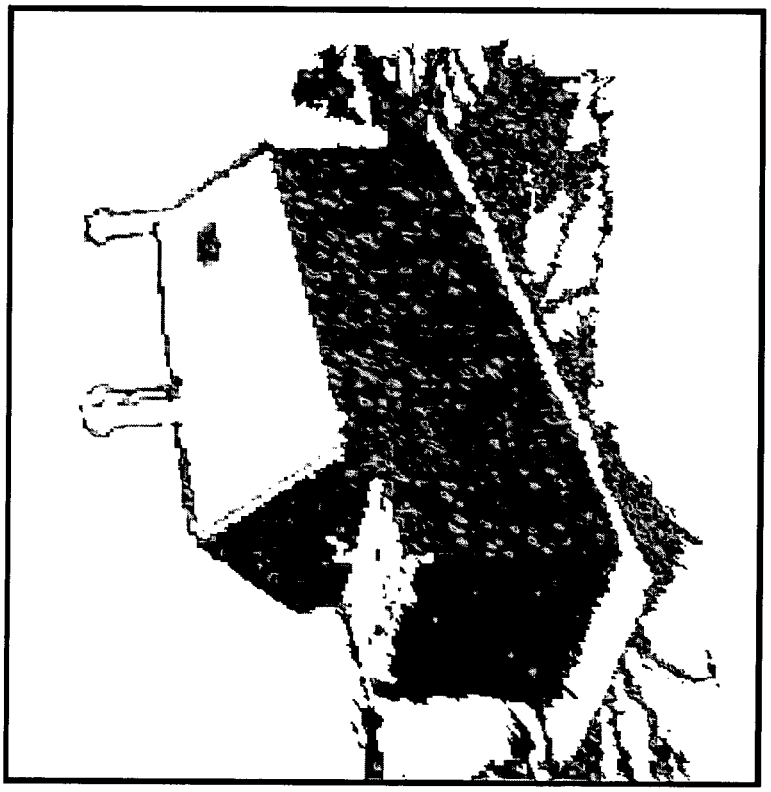
Figure 9A:
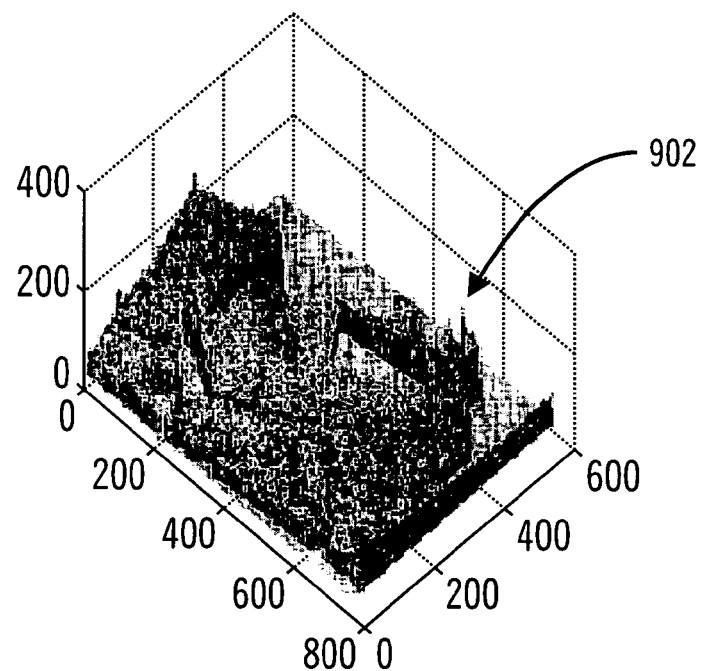
FIG. 9 shows four depth maps comparing a binocular stereo method vs. a Multi-Plane stereo method.
Figure 9B:
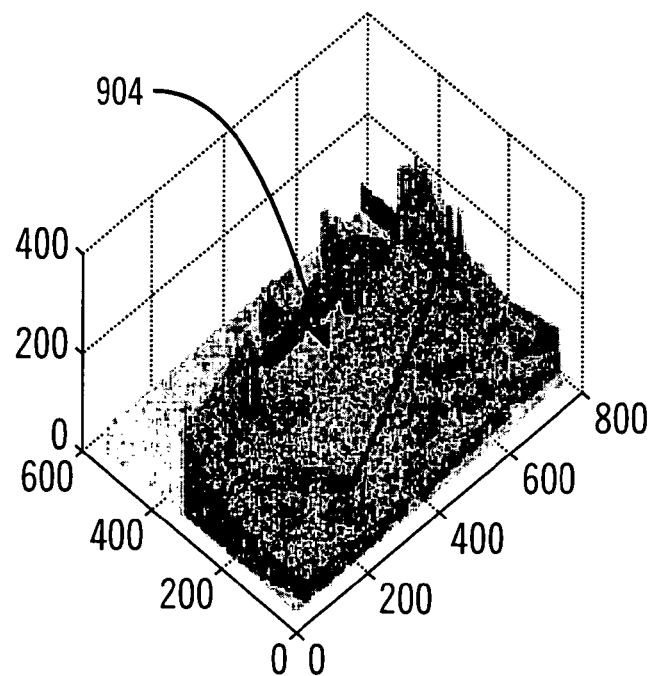
Figure 9C:
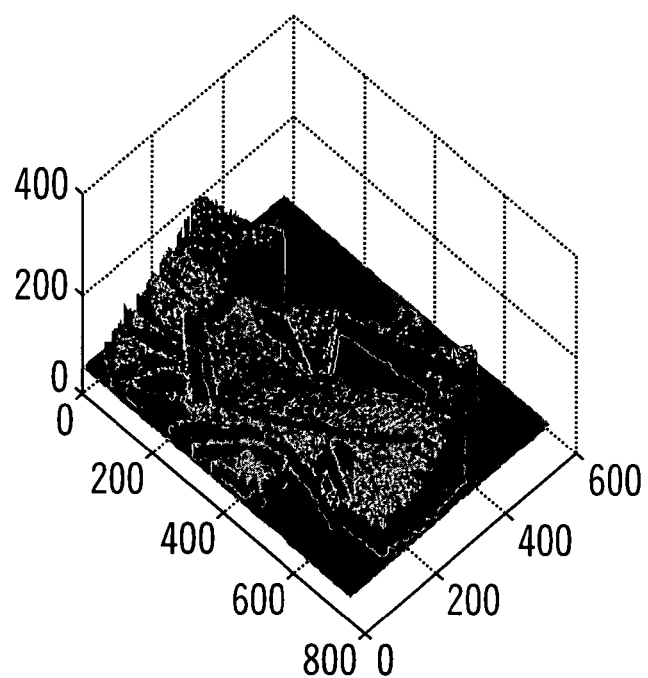
Figure 9D:
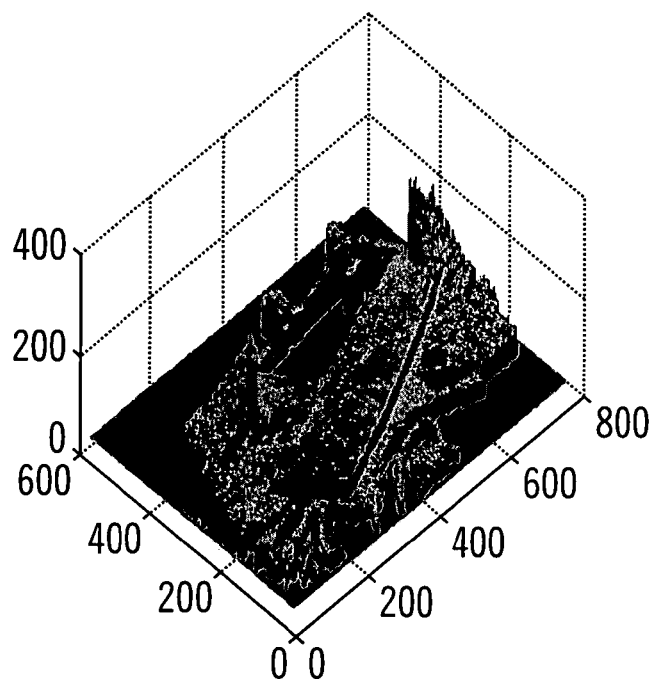

FIG. 8 shows two views of the reconstructed house model. Observe that discontinuities at both sides of the house walls are preserved. Also observe the shapes on the sidewall which indicate doors and windows.

In FIG. 9, depth maps are shown as shaded 3-D surfaces where the XY-plane represents the image coordinate system, and the Z-axis represents depth. FIG. 9 shows four views, FIG. 9A and FIG. 9B represent depth surface views using a binocular stereo method, while FIG. 9C and FIG. 9D represent depth surface views using an MPS method. Visually, it is seen that the depth surface from two-view binocular stereo is much bumpier than that from MPS. Particularly, notice the sidewall of the house and the portion of the carpet close to the right image border, as indicated by the arrows 902, 904.

Some Potential Benefits in Commercial Applications

Once the depth is obtained, two-dimensional images can be enhanced with three-dimensional information. This, for example, allows augmenting images in several ways. As a first example, by combining the original intensity image with its depth image, a new kind of image is generated. In this depth-enhanced image, as a second example, a synthetic object can be inserted into the image which forms different mutual occlusion with those existing objects in the original scene. Other applications include augmenting images by adding synthetic lights or changing the geometric shapes of the objects in the images. For instance, before conducting a plastic surgery to a person, his or her photos are taken and 3-D geometry is formed from the depth information. Then, the photos can be modified showing the patient's new nose or new breasts until the patient's expectations are satisfied. The collected information is then forwarded to the surgeon to help the surgeon more accurately conduct the surgical procedure.

Exemplary System Implementation

Figure 10:
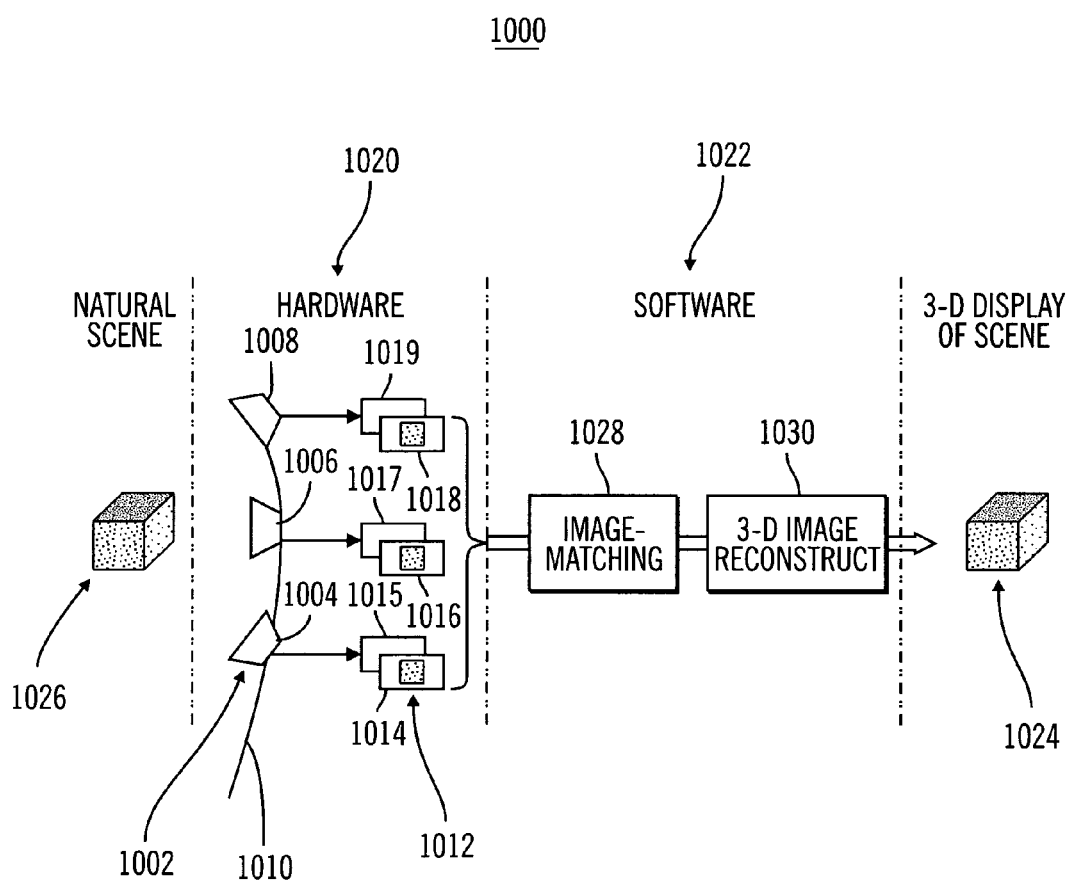
FIG. 10 is a block diagram illustrating an exemplary 3-D image processing system according to a preferred embodiment of the present invention.

According to a preferred embodiment of the present invention, as shown in FIG. 10, an exemplary 3-D image processing system 1000 comprises a set of digital (still or video) cameras 1002, three cameras 1004, 1006, 1008, being shown, which are arranged with different poses and are electronically synchronized such as via an electrical signal bus 1010. At any time instant, the cameras 1002 generate a set of images 1012, such as three images 1014, 1016, 1018, being shown for the three respective digital capture interfaces 1015, 1017, 1019, for the three cameras 1004, 1006, 1008. Each of the set of images 1012 deviates from the other images in the set of images 1012 by camera relative motion. For example, the first image 1014 and the second image 1016 can deviate from one another by a distance between corresponding feature points found on both images 1014, 1016, due to the different poses of the cameras 1004, 1006, relative to a scene 1026. This camera relative motion between the two images 1014, 1016, can be represented by a motion vector between feature points that correspond (i.e., that match) between the two images 1014, 1016. Additionally, although still cameras 1004, 1006, 1008, and a still scene 1026 are shown in this example, it should become obvious to one of ordinary skill in the art in view of the teachings herein that any combination of still and/or moving scene 1026 and/or cameras 1004, 1006, 1008, can be represented in accordance with alternative embodiments of the present invention. For example, a moving object scene 1026 and utilizing still cameras 1004, 1006, 1008, may be perfectly desirable for certain applications of the present invention. Therefore, the term camera relative motion, as used herein, is intended to broadly cover all such alternative embodiments of the present invention wherein any combination of still and/or moving scene 1026 and/or cameras 1004, 1006, 1008, can be represented.

The three respective digital capture interfaces 1015, 1017, 1019, are communicatively coupled to a computer system (not shown in FIG. 10). The set of images 1012 is then processed by the hardware 1020, the computer system (not shown), and the software 1022 of the system 1000 to output 3-D image information 1024 of the scene 1026 observed by the set of cameras 1002. The software 1022 preferably comprises a point detection and matching module 1028, as taught in U.S. patent application Ser. No. 09/825,266, entitled "Methods And Apparatus For Matching Multiple Images", filed on Apr. 3, 2001, which is commonly owned and the entire teachings of which are hereby incorporated by reference. This image matching module 1028 provides the seed points for further processing to extract the 3-D depth information. A 3-D image reconstruction module 1030, as will be discussed in more detail below, provides additional processing of the image information after the image feature points have been detected and matched across views to capture a 3-D image of the scene 1024 that, for example, can be displayed (such as via a display) to a user of the system 1000.

Figure 11:
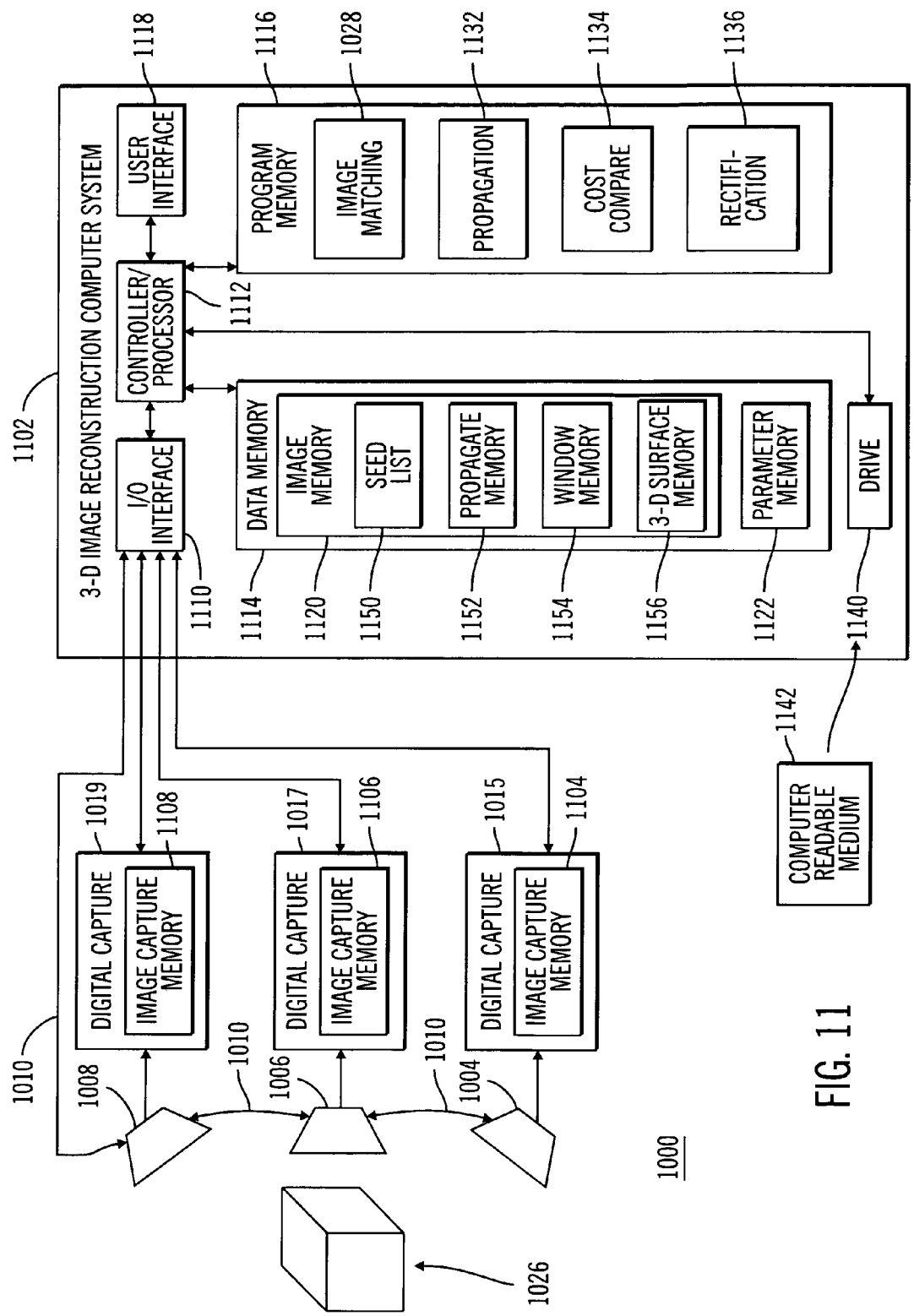
FIG. 11 is a more detailed view of the 3-D image processing system of FIG. 10.

FIG. 11 illustrates a more detailed view of the 3-D image processing system 1000 of FIG. 10, according to a preferred embodiment of the present invention. Each of the digital capture interfaces 1015, 1017, 1019, includes respective image capture memory 1104, 1106, 1108, for storing a captured image 1014, 1016, 1018. The digital capture interfaces 1015, 1017, 1019, are communicatively coupled to an input/output interface 1110 of a 3-D image reconstruction computer system 1102. Additionally, the electrical signal bus 1010 is communicatively coupled to the input/output interface 1110. The 3-D image reconstruction computer system 1102 comprises a controller/processor 1112 that is electrically coupled to data memory 1114 and to program memory 1116. The controller/processor 1112 is also electrically coupled to a user interface 1118 that presents information to a user, such as via a monitor display (not shown), and receives user input from the user such as via a keyboard (not shown) and a mouse (not shown).

The data memory 1114 includes an image memory 1120 for storing image information. The image memory 1120 comprises data structures for a seed list 1150, a Propagate memory 1152 to keep track of front propagation results for each piece of depth surface being propagated, a Window memory 1154 to keep track of windows surrounding pixels for propagating each piece of depth surface, and a 3-D Surface memory 1156 that keeps track of the propagated pieces of depth surface. These data structures are used by the 3-D image reconstruction functional module 1028 as will be discussed in more detail below. Additionally, the data memory 1114 includes a parameter memory 1122 where the 3-D image reconstruction computer system 1102 stores configuration parameters for the 3-D image processing system 1000.

The program memory 1116 provides computer program instructions for the controller/processor 1112 for performing operational sequences for the 3-D image processing system 1000, according to the preferred embodiments of the present invention. The program memory 1116 includes four functional modules. The four functional modules are as follows: an image matching module 1028, a propagation module 1132 for computing the propagation of depth parameter for surface pieces, a cost compare handler 1134 for computing the relative cost of two surface pieces being propagated and meeting at a boundary, and a rectification handler 1136 that can be optionally used to operate on rectification matrices of images to improve the image processing by cross-correlation. These four functional modules will be discussed in more detail below.

Additionally, the 3-D image reconstruction computer system 1102 preferably includes a drive 1140 for receiving the computer readable medium 1142. This provides a means of transferring of information with the 3-D image reconstruction computer system 1102. For example, computer programs (and updates thereto) can be provided to the 3-D image reconstruction computer system 1102 and stored in the program memory 1116 via the computer readable medium 1142 in a manner well known to those of ordinary skill in the art. Additionally, image information and related parameters can be transferred between the computer readable medium 1142 and the data memory 1114.

According to a preferred embodiment of the present invention, the point detection and image matching module 1028 operates in the 3-D image reconstruction computer system 1102 and is stored in the program memory 1116. The image matching module 1028, according to one embodiment of the present invention, operates on image information in a series of four operational stages that progressively improve the correspondence of image information across a plurality of images representative of a scene. As a result of the fourth stage, i.e., a multiple-view robust matching handler, the correspondence of the image information across the plurality of images (views) is significantly improved over known prior art systems. The resulting image information that corresponds across the plurality of views provides image features (such as pixels) as seeds for the 3-D image reconstruction computer system 1102 to extract the 3-D image depth information as discussed above, according to the present invention.

According to a preferred embodiment of the present invention, significant portions of the 3-D image processing system 1000 may be implemented in integrated circuits. For example, functional components of the 3-D image reconstruction computer system 1102 may be implemented in at least one integrated circuit. Similarly, significant portions of the digital capture modules 1015, 1017, 1019, can be implemented in at least one integrated circuit.

According to alternative embodiments of the present invention, the 3-D image processing system 1000 may be implemented, for example, in devices such as three-dimensional scanners, facsimile machines, video communication equipment, and video processing equipment.

Figure 12:
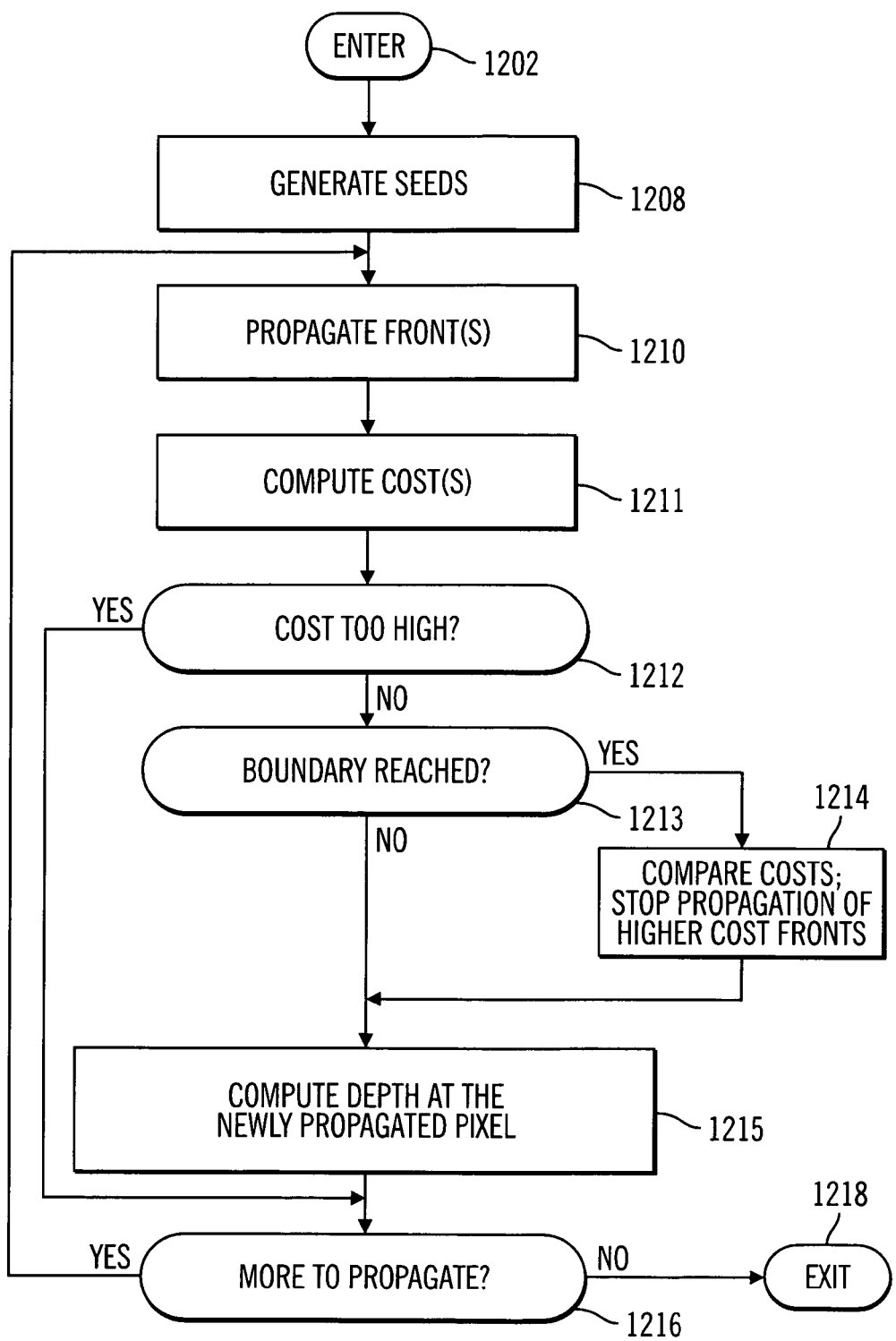
FIG. 12 is an operational flow diagram illustrating an exemplary operational sequence for the 3-D image processing system shown in FIGS. 10 and 11, according to a preferred embodiment of the present invention.

Referring to FIG. 12, the controller/processor 1112 enters the operational sequence at step 1202, and initializes system parameters in the parameter memory 1122. The controller/processor 1112 then operates according to the image matching module 1028 to provide seeds, at step 1208. The image matching module 1028, as discussed above, utilizes a series of functional modules to match image features across the plurality of images from the cameras 1004, 1006, 1008, resulting in a set of image features, such as pixels, that are stored in the seed list memory 1150, at step 1208.

The operational sequence then repeats, at steps 1210, 1211, 1212, 1213, 1214, 1215, and 1216, to propagate depth surface fronts from the seed points until the entire depth surface computations for the base view has been completed. At step 1212, if the cost of a newly propagated pixel is too high, the controller/processor 1112 abandons it and directly goes to further propagation. At step 1213 when a boundary of two surface pieces is reached, the matching costs of the piece surfaces are compared, at step 1214, and the propagation of the higher cost surface is stopped. After the entire depth surface has been computed, at step 1216, the operational sequence then exits, at step 1218.

3-D Image Reconstruction System Realization

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus or integrated circuit adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

The 3-D image processing system 1000 according to the present invention provides significant advantages over the known prior art. The present system 1000 can be much more accurate and efficient at reconstructing 3-D image information for a base view relative to multiple reference views. The 3-D image processing system 1000 according to the present invention provides a practicable approach to capturing 3-D image information from across multiple images of a scene.

Accordingly, due to the remarkable efficiency of the embodiments of the present invention, an implementation in an integrated circuit (IC) chip is very feasible and desirable. Generally, a circuit supporting substrate and associated circuits, such as provided by an IC, a circuit board, and a printed circuit card, and other similar embodiments, and including the functional modules according to the present invention as discussed above, can provide a modular solution for enabling a computer system to benefit from the very accurate 3-D image processing methods according to the present invention. Such electronic devices as a three dimensional scanner and a 3-dimensional video image capture system are commercially feasible. Additionally, since the system according to the present invention can beneficially utilize many more cameras, e.g., more than two or three cameras, then the 3-D image capture methods of the present invention can advantageously operate both with a still object in a scene as well as with a moving object in a scene.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of recovering depth information for pixels of a base image representing a view of a scene, the method comprising the steps of:
   detecting a plurality of pixels in a base image that represents a first view of a scene, wherein the first view is one of at least three relative views of a scene;
   determining 3-D depth of the plurality of pixels in the base image by contemporaneously matching image features between three or more relative images of a scene by matching correspondence to a plurality of pixels in three or more relative images representing the at least three relative views of the scene, wherein the three or more images are captured relative to each other and are of the same scene, and wherein each of the three or more images includes at least an overlapping portion of the scene relative to each other, wherein the at least three relative views of the scene are situated in a non-linear arrangement relative to each other and are further oriented in non-parallel planes relative to each other; and
   tracing pixels in a virtual piecewise continuous depth surface by spatial propagation starting from the detected pixels in the base image by using the matching and corresponding plurality of pixels in the three or more relative images to create the virtual piecewise continuous depth surface viewed from the base image, each successfully traced pixel being associated with a depth in the scene viewed from the base image.

2. The method of claim 1, wherein the step of determining the 3-D depth comprises the steps of:
   detecting a plurality of image pixels in a first image corresponding to a first view of a scene;
   detecting a plurality of image pixels in at least a second image corresponding to a respective at least a second view of the scene, wherein the at least a second image deviates from the first image as a result of camera relative motion;
   determining a first two-view correspondence between the plurality of detected image pixels in the first image and a plurality of detected image pixels in one of the at least a second image resulting in a potential two-view match set of candidate image pixels between the first image and the one of the at least a second image;
   concatenating a plurality of two-view match sets to form a first multiple-view potential match set; and determining a second multiple-view potential match set that is a refinement of the first multiple-view potential match set.

3. The method of claim 2, wherein the second multiple-view potential match set is based at least in part on a least median of squares computation of the reprojection errors related to matched pixels in the first multiple-view potential match set.

4. The method of claim 1, wherein the tracing step comprises the step of:
propagating a front of a virtual piece of a continuous depth surface to at least one neighboring pixel starting from the detected pixels in the base image.

5. The method of claim 4, wherein the tracing step comprises the step of:
   determining when a boundary is reached between two propagating fronts of virtual pieces of a continuous depth surface.

6. The method of claim 4, wherein the tracing step comprises the steps of:
   comparing the matching costs of the two propagating fronts about the reached boundary; and
   stopping the propagation of the front with the higher compared matching cost.

7. The method of claim 1, wherein the tracing step comprises the step of:
   propagating a front of a virtual piece of a continuous depth surface to at least one neighboring pixel surrounded by a predefined size window in the continuous depth surface.

8. The method of claim 7, wherein the tracing step comprises the step of:
   determining when a boundary is reached between two propagating fronts of virtual pieces of a continuous depth surface.

9. The method of claim 7, wherein the tracing step comprises the steps of:
   comparing the matching costs of the two propagating fronts about the reached boundary; and
   stopping the propagation of the front with the higher compared matching cost.

10. The method of claim 9, wherein the matching cost is determined by computing the summation of all the normalized cross-correlations between a first image window of a pre-determined size in the base view, and a second image window of the same pre-determined size in one of at least one reference view.

11. The method of claim 10, further comprising a step of:
    rectification of at least one pair of images corresponding to the base view of the scene and one of the at least one reference view.

12. An image processing system comprising:
    a memory;
    a controller/processor electrically coupled to the memory;
    an image matching module, electrically coupled to the controller/processor and to the memory, for providing a plurality of seed pixels that represent 3-D depth of the plurality of pixels in the base image view of a scene by contemporaneously matching image features between three or more relative images of a scene by matching correspondence to a plurality of pixels in three or more relative images representing a plurality of relative views of the scene, wherein the three or more relative images are captured relative to each other and are of the same scene, and wherein each of the three or more images includes at least an overlapping portion of the scene relative to each other, wherein the base image view is one of at least three relative views of the scene, the at least three relative views of the scene being situated in a non-linear arrangement and are further oriented in non-parallel planes relative to each other; and
    a propagation module, electrically coupled to the controller/processor and to the memory, for tracing pixels in a virtual piecewise continuous depth surface by spatial propagation starting from the provided plurality of seed pixels in the base image by using the matching and corresponding plurality of pixels in the three or more relative images to create the virtual piecewise continuous depth surface viewed from the base image, each successfully traced pixel being associated with a depth in the scene viewed from the base image.

13. The image processing system of claim 12, further comprising at least one camera interface, electrically coupled to the controller/processor, for sending image information from at least one camera to the controller/processor.

14. The image processing system of claim 12, wherein the controller/processor, the memory, the image matching module, and the propagation module, are implemented in at least one of an integrated circuit, a circuit supporting substrate, and a scanner.

15. The image processing system of claim 12, wherein the propagation module is further for determining when a boundary is reached between two propagating fronts of virtual pieces of a continuous depth surface.

16. The image processing system of claim 15, wherein the propagation module is further for
comparing the matching costs of the two propagating fronts about the reached boundary; and
stopping the propagation of the front with the higher compared matching cost.

17. The image processing system of claim 12, wherein the propagation module is further for propagating a front of a virtual piece of a continuous depth surface to at least one neighboring pixel surrounded by a predefined size window in the continuous depth surface.

18. A non-transitory computer readable medium including computer instructions for a 3-D image reconstruction computer system, the computer instructions comprising instructions for:
detecting a plurality of pixels in a base image that represents a first view of a scene, wherein the first view is one of at least three relative views of a scene;
determining 3-D depth of the plurality of pixels in the base image by contemporaneously matching image features between three or more relative images of a scene by matching correspondence to a plurality of pixels in three or more relative images representing the at least three relative views of the scene, wherein the three or more images are captured relative to each other and are of the same scene, and wherein each of the three or more images includes at least an overlapping portion of the scene relative to each other, wherein the at least three relative views of the scene are situated in a non-linear arrangement relative to each other and are further oriented in non-parallel planes relative to each other; and
tracing pixels in a virtual piecewise continuous depth surface by spatial propagation starting from the detected pixels in the base image by using the matching and corresponding plurality of pixels in the three or more relative images to create the virtual piecewise continuous depth surface viewed from the base image, each successfully traced pixel being associated with a depth in the scene viewed from the base image.

19. The computer readable medium of claim 18, wherein the step of determining the 3-D depth comprises the steps of:
detecting a plurality of image pixels in a first image corresponding to a first view of a scene;
detecting a plurality of image pixels in at least a second image corresponding to a respective at least a second view of the scene, wherein the at least a second image deviates from the first image as a result of camera relative motion;
determining a first two-view correspondence between the plurality of detected image pixels in the first image and a plurality of detected image pixels in one of the at least a second image resulting in a potential two-view match set of candidate image pixels between the first image and the one of the at least a second image;
concatenating a plurality of two-view match sets to form a first multiple-view potential match set; and
determining a second multiple-view potential match set that is a refinement of the first multiple-view potential match set.

20. The computer readable medium of claim 19, wherein the second multiple-view potential match set is based at least in part on a least median of squares computation of the reprojection errors related to matched pixels in the first multiple-view potential match set.

21. The computer readable medium of claim 18, wherein the tracing step comprises the step of:
propagating a front of a virtual piece of a continuous depth surface to at least one neighboring pixel starting from the detected pixels in the base image.

22. The computer readable medium of claim 21, wherein the tracing step comprises the step of:
determining when a boundary is reached between two propagating fronts of virtual pieces of a continuous depth surface.

23. The computer readable medium of claim 21, wherein the tracing step comprises the steps of:
comparing the matching costs of the two propagating fronts about the reached boundary; and
stopping the propagation of the front with the higher compared matching cost.

24. The computer readable medium of claim 18, wherein the tracing step comprises the step of:
propagating a front of a virtual piece of a continuous depth surface to at least one neighboring pixel surrounded by a predefined size window in the continuous depth surface.

25. The computer readable medium of claim 24, wherein the tracing step comprises the step of:
determining when a boundary is reached between two propagating fronts of virtual pieces of a continuous depth surface.

26. The computer readable medium of claim 24, wherein the tracing step comprises the steps of:
comparing the matching costs of the two propagating fronts about the reached boundary; and
stopping the propagation of the front with the higher compared matching cost.

27. The computer readable medium of claim 26, wherein the matching cost is determined by computing a normalized cross-correlation between the windows associated with the two propagating fronts about the reached boundary.

28. The computer readable medium of claim 27, further comprising a step of:
rectification of at least one pair of images corresponding to at least one pair of views of the scene.

29. A method of recovering depth information for pixels of a base image representing a view of a scene, the method comprising the steps of:
capturing a base image representing a view of a scene;
tracing at least one parameter surface associated with the base image, each of the at least one parameter surface traced starting from at least one predetermined seed pixel point associated with the base image;
calculating a derivative of function E(g) with respect to parameter g by using finite difference to minimize the following equation $$E(g) = \sum_{i=1}^{m} \left\{ 1 - NCC_\omega[I_i(\overline{u}(g), \overline{v}(g)), I_0(u_j, v_j)] \right\},$$

where $$NCC_\omega[I_i(\overline{u}, \overline{v}), I_0(u_j, v_j)]$$

is a normalized cross-correlation between $I_i(\overline{u}, \overline{v})$ and $I_0(u_j, v_j)$;

$I_i(\overline{u}, \overline{v})$ is a first window of size $\omega \times \omega$ centered at pixel $(\overline{u}, \overline{v})$ in $I_i$, $I_0(u_j, v_j)$ is a second window of size $\omega \times \omega$ centered at pixel $(u_j, v_j)$ in $I_0$, $I_i$ is a reference image, $I_0$ is a base image, $(\overline{u}, \overline{v})$ is a pixel point closest to $P_i(C_0 + gL(u_j, v_j))$;

$C_0 + gL(u_j, v_j)$ is a 3-D point that projects to $(u_j, v_j)$ in the base view, and to $P_i(C_0 + gL(u_j, v_j))$ in the $i^{th}$ reference view;

$C_0$ is the base image camera's center of projection;

$L(u_j, v_j)$ is the unit vector from $C_0$ to the point on the image plane that corresponds the pixel $(u_j, v_j)$;

g is a depth parameter; and storing the calculated derivative of the function E(g) in a memory; and generating a three-dimensional image of at least a portion of the scene using at least the calculated derivative of the function E(g) that has been stored in memory.

\* \* \* \* \*